United States Patent [19]

Dawson et al.

[11] Patent Number: 5,152,820
[45] Date of Patent: Oct. 6, 1992

[54] IRON CHELATE COMPOSITIONS

[75] Inventors: John M. Dawson; Vivian B. Warne, both of North Humberside, Great Britain

[73] Assignee: Phosyn plc., Pocklington, Great Britain

[21] Appl. No.: 803,763

[22] Filed: Dec. 5, 1991

Related U.S. Application Data

[63] Continuation of Ser. No. 327,719, Mar. 23, 1989, abandoned.

[30] Foreign Application Priority Data

Mar. 25, 1988 [GB] United Kingdom ................. 8807197

[51] Int. Cl.$^5$ ............................................... C05C 11/00
[52] U.S. Cl. ............................................... 71/27; 71/1;
71/903; 71/DIG. 2
[58] Field of Search .................. 71/DIG. 2, 1, 27, 903

[56] References Cited

U.S. PATENT DOCUMENTS

| | | | |
|---|---|---|---|
| 2,891,854 | 6/1959 | Kroll et al. | 71/DIG. 2 |
| 3,706,545 | 12/1972 | Gray et al. | |
| 3,898,070 | 8/1975 | Dazzi | 71/DIG. 2 |
| 3,980,462 | 9/1976 | Corte et al. | |
| 4,047,921 | 9/1977 | Mues et al. | 71/DIG. 2 |
| 4,053,296 | 10/1977 | Mues et al. | 71/DIG. 2 |
| 4,069,249 | 1/1978 | Gaudette et al. | |
| 4,111,678 | 9/1978 | Downer | |
| 4,152,345 | 5/1979 | Gaudette et al. | |
| 4,167,405 | 9/1979 | Mues et al. | 71/DIG. 2 |
| 4,181,516 | 1/1980 | Gray | 71/DIG. 2 |
| 4,225,502 | 9/1980 | Gaudette et al. | |
| 4,319,910 | 3/1982 | Meyer | |
| 4,338,460 | 7/1982 | Gaudette et al. | |

FOREIGN PATENT DOCUMENTS

| | | | |
|---|---|---|---|
| 0205748 | 12/1986 | European Pat. Off. | |
| 2138068 | 3/1972 | Fed. Rep. of Germany | |
| 2445741 | 4/1975 | Fed. Rep. of Germany | |
| 2815930 | 10/1979 | Fed. Rep. of Germany | |
| 2846832 | 2/1980 | Fed. Rep. of Germany | |
| 1319506 | 6/1973 | United Kingdom | |
| 1402764 | 8/1975 | United Kingdom | |
| 1505351 | 3/1978 | United Kingdom | 71/DIG. 2 |
| 1577269 | 10/1980 | United Kingdom | |

*Primary Examiner*—Wayne Langel
*Attorney, Agent, or Firm*—Cumpston & Shaw

[57] ABSTRACT

The composition contains iron EDDHA and for iron EDDHMA in an agriculturally-acceptable organic solvent, preferably ethylene glycol. The composition is used in treating iron deficiency in soils and can have an iron content of up to 40 or 50 g dm$^{-3}$. The composition may also contain considerable amounts of water yet still to be stable at room temperature, the aqueous composition having a significantly reduced viscosity relative to the water-free composition. The iron chelate need not be dry when incorporated into the composition. It may also be synthesized in situ in the solvent of the composition.

11 Claims, No Drawings

IRON CHELATE COMPOSITIONS

This is a continuation of copending application Ser. No. 07/327,719 filed on Mar. 23, 1989, abandoned.

BACKGROUND TO THE INVENTION

1. Field of the Invention

This invention relates to iron chelate compositions.

Iron chelate compounds include the compounds which contain the anions [Fe (III) EDDHA]$^-$ and [Fe (III) EDDHMA]$^-$, together with a cation, for example Na$^+$ or K$^+$. [Fe (III) EDDHA]$^-$ is the chelate anion formed between ferric iron and the quadrivalent anion of ethylenediamine-N,N'-di-(o-hydroxyphenyl acetic acid), ethylenediamine-N,N'-di-(p-hydroxyphenyl acetic acid) or ethylenediamine-N-o-hydroxyphenyl acetic acid-N'-p-hydroxyphenyl acetic acid. Commercially-available materials often contain mixtures of the ortho, para and ortho-para isomers mentioned. Although the chelating powers of the three isomers may vary considerably, the expression "iron EDDHA" as used herein covers any compound which contains, in addition to a cation or two or more different cations, a monovalent anion in which ferric iron is chelated by the EDDHA anion in any one or more of its isomeric forms, and mixtures of such compounds. [Fe (III) EDDHMA]$^-$ is the chelate anion formed between ferric iron and the quadrivalent anion of either ethylenediamine-N,N'-di-(2-hydroxy-4-methylphenyl acetic acid) or ethylenediamine-N,N'-di-(2-hydroxy-3-methylphenyl acetic acid). The chelating powers of the isomers are again not necessarily equal but the expression "iron EDDHMA" as used herein covers any compound which contains, in addition to a cation or two or more different cations, a monovalent anion in which ferric iron chelated by the EDDHMA anion in any one or more of its ismoeric forms, and mixtures of such compounds. The compounds just mentioned are sometimes identified by names such as sodium ethylenediamine-N,N'-di-(o-hydroxyphenyl) acetato ferrate (III), which corresponds to the compound containing sodium ions and the ortho-ortho form of the chelated anion [Fe (III) EDDHA]$^-$.

2. Description of the Prior Art

Iron EDDHA and iron EDDHMA are known to be effective agents for remedying iron deficiency in agriculture, particularly in highly alkaline soils. In the past, powders or granules of iron EDDHA or iron EDDHMA have been applied directly to the soil or have been dissolved in irrigation water. Both compounds however suffer from the disadvantage of low solubility in water; the powder forms are particularly difficult to handle because of their tendency to cake or form lumps in the presence of water. Aqueous solutions of the compounds are correspondingly difficult to prepare.

Attempts to make such solutions tend to result in the precipitation of a sticky mass of material in the mixing vessel, unless the addition of the solid iron EDDHA or EDDHMA to the water is accompanied by continuous strong agitation of the contents of vessel. This causes a particular problem when it is desired to dissolve the compounds in irrigation water where agitation to said dissolution is difficult. Attempts to solve this problem by preparing aqueous solutions of the compounds for direct application to the soil have not been particularly successful because, even if sufficient agitation is used, it is not possible to obtain a solution which is more concentrated in iron EDDHA than about 30% w/v (i.e. about 30 g of iron EDDHA chelate in 100 cm$^3$ of solution, an iron EDDHA concentration of about 300 g dm$^{-3}$), or more concentrated in iron EDDHMA than about 20% w/v (i.e. about 20 g of iron EDDHMA chelate in 100 cm$^3$ of solution, an iron EDDHMA concentration of about 200 g dm$^{-3}$).

Since commercially available iron EDDHA and EDDHMA chelates are themselves only about 6% iron by weight and normally contain equimolar amounts of salts such as sodium sulphate or sodium chloride, a 30% w/v aqueous solution of iron EDDHA has an iron concentration of only about 1.8 g per 100 cm$^3$ (about 18 g dm$^{-3}$) and a 20% w/v aqueous solution of iron EDDHMA has an iron concentration of only about 1.2 g per 100 cm$^3$ (about 12 g dm$^{-3}$).

The low iron contents of these solutions, the difficulties in preparing the solutions and the problems which are associated with agricultural use of iron EDDHA and EDDHMA chelates in solid form (even after granulation, itself an expensive process) tend to restrict the agricultural usefulness of what might otherwise be an effective agent for remedying iron deficiency in soils. Similar problems are expected to arise in the agricultural use of other iron chelate compounds.

SUMMARY OF THE INVENTION

It is an object of this invention to provide a composition for remedying iron deficiency in soils which is more easily prepared and/or used than the compositions mentioned above.

It is another object of the invention to provide a composition which contains more iron per unit volume and/or mass than known compositions.

It is a further object to provide a composition which can be prepared without the necessity for time- or energy-consuming drying or purification steps.

The present invention provides a composition for use in treating iron deficiency in soils, the composition comprising an effective amount of an iron chelate compound and an agriculturally-acceptable organic solvent.

The organic solvent conveniently comprises a monohydric alcohol, for example butanol, or a mixture thereof such as industrial methylated spirit ("IMS"); ethylene glycol or another polyhydric alcohol; an ether, for example the monoethyl ether of ethylene glycol (i.e. 2 ethoxyethanol); an ester, for example ethyl acetate; a ketone, for example acetone, methyl ethyl ketone, methyl isobutyl ketone or cyclohexanone, or a strongly-polar solvent, for example dimethylformamide, dimethyl sulphoxide or acetonitrile.

Preferably, the solvent is a polyhydric alcohol, more preferably ethylene glycol, or an ether of such an alcohol, more preferably an ether of ethylene glycol, for example 2-ethoxyethanol.

The iron chelate compound is preferably one in which the chelating molecule or ion is an ethylenediamine derivative and is advantageously iron EDDHA or iron EDDHMA, or a mixture thereof.

The ratio of iron chelate to organic solvent is preferably in the range of 1:9 to 29:1 by mass, more preferably in the range of 1:3 to 3:1 by mass and most preferably about 1:1 by mass.

Typical compositions according to the invention may thus have iron chelate concentrations as high as about 700 g dm$^{-3}$ and iron contents of about 40 or 50 g dm$^{-3}$. The compositions can thus be sufficiently concentrated in iron to the highly useful as remedial agents against iron deficiency in soils.

Advantageously, the organic solvent is one which allows the composition to have a significant water content. The amount of water in the composition is preferably such that the mass ratio of organic solvent to water is in the range of 99:1 to 1:99, more preferably in the range of 10:1 to 1:10 and most preferably about 2:1, always provided that the amount of water is such that the stability of the composition is not impaired. In general, as the iron chelate content of the composition increases, the amount of water which can be added whilst still maintaining stability, and, with iron EDDHMA compositions, an acceptable viscosity, decreases. For example, a composition with an iron EDDHA chelate concentration of 700 g dm$^{-3}$ can contain ethylene glycol and water in a mass ratio of from 1:0 to 1:1, preferably in the range of 3:1 to 1.1:1 and more preferably about 2.3:1. Thus, for example, at an iron EDDHA chelate concentration of 700 g dm$^{-3}$, the composition can contain as much as 300 g dm$^{-3}$ of water and only 340 g dm$^{-3}$ of ethylene glycol and still be stable at room temperature.

These aqueous compositions can have significantly reduced viscosity relative to the water-free compositions and are accordingly more easily handled and used and, volume for volume, are less expensive than the water-free compositions.

Compositions according to the invention preferably have a viscosity at 20° C. in the range of 0.005 to 70 Pa s (5 to 7000 cP), more preferably in the range of 0.1 to 10 Pa s (100 to 1000 cP) and most preferably as close to 0.5 Pa s (500 cP) as possible.

A further advantage of the aqueous compositions of the invention is that the iron chelate compound used to prepare the composition need not be entirely dry. Energy which would be expended in drying the chelate compound can thereby be saved.

Moreover, the iron chelate compound used to prepare either an aqueous or a water-free composition according to the invention may contain an amount of an agriculturally-acceptable solvent, preferably the same solvent as is contained in the composition. The effort and energy which would otherwise be expended in removing residual solvent from the chelate is thus saved. This is particularly the case when the solvent present in the chelate compound is a solvent in which synthesis of the iron chelate compound has been carried out.

The aqueous and water-free solutions are useful as remedial agents against iron deficiency in soil and can be applied to the soil by, for example, direct spraying or by incorporation into irrigation water.

DESCRIPTION OF PREFERRED EMBODIMENTS

The invention will now be explained further by way of the following examples of the preparation and use of EDDHA chelate compositions.

EXAMPLE 1

200g of water was introduced into the mixing vessel of a Silverson mixing machine and the mixing machine started at half speed. 450 g (403 cm$^3$) of ethylene glycol was then added to the water in the mixing vessel. To the water-ethylene glycol mixture, 700 g of commercial iron EDDHA powder was added over a period of about 5 min. After addition was complete, stirring was continued for about 10 min, after which the mixing machine was stopped.

The composition produced was a dense blood-red solution having an iron EDDHA concentration of 700 g dm$^{-3}$, corresponding to an iron concentration of 42 g dm$^{-3}$. The solution was apparently stable for an indefinite period over a temperature range of from 40° C. to −15° C.

The composition was found to be effective as an agent for remedying iron deficiency when applied to the soil by spraying.

EXAMPLE 2

The procedure of Example 1 was followed except that 500 g of commercial iron EDDHA powder was added to a mixture of 200 g of water and 510 g of ethylene glycol to give a composition having an iron EDDHA concentration of 500 g dm$^{-3}$ (corresponding to a 30 g dm$^{-3}$ iron). This composition was effective in the way stated for the composition of Example 1.

EXAMPLE 3

The procedure of Example 1 was repeated omitting the water, increasing the amount of ethylene glycol to 660 g and using 700 g of iron EDDHMA to give a solution of corresponding strength. The composition was similarly effective in remedying iron deficiency in soils.

EXAMPLE 4

The procedure of Example 2 was repeated using 500 g of commercial iron EDDHMA powder in place of the iron EDDHA powder to give a composition having an iron EDDHMA concentration of 500 g dm$^{-3}$.

EXAMPLE 5

This example describes the preparation in an agriculturally-acceptable solvent of iron EDDHA. Any residual amount of the solvent need not be removed from the iron EDDHA product before its use in a composition according to the invention.

The known reaction between 2 moles of phenol, 2 moles of glyoxylic acid, 1 mole of ethylenediamine and 4 moles of sodium hydroxide proceeds according to the equation:

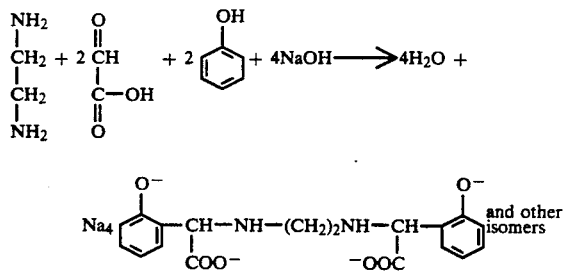

Addition of Fe$^{3+}$ ions at a pH of 7.0 to 8.5 leads to formation of Na[FeEDDHA].

The reaction, when carried out in ethylene glycol as solvent, leads to formation of a composition according to the present invention.

Details of the reaction procedure are as follows, all parts being by weight:

A reaction vessel fitted with a condenser, dropping funnels and a mechanical agitator was charged with 9.4 parts phenol (0.1 mol) and 18 parts ethylene glycol as solvent.

These were heated to 40° to 45° C. and 3 parts of ethylenediamene (0.05 mol) and 8 parts 50% w/w aqueous sodium hydroxide solution (0.1 mol) added.

The reaction mixture was stirred constantly and maintained at 40° to 45° C. 14.8 parts of 50% w/w glyoxylic acid were added over a period of 15 minutes.

After complete addition of the glyoxylic acid the reaction mixture was stirred constantly and maintained at 70° to 75° C. for 2 hours.

13.51 parts of ferric chloride hexahydrate (0.05 mol iron) were dissolved in 5 parts of water. This solution was added slowly to the cooled reaction mixture with constant stirring. The pH was monitored throughout this addition and maintained between 7.0 and 8.5 using 50% w/w sodium hydroxide solution. After complete addition, the mixture was stirred for a further 30 minutes still maintaining the pH at 7.0 to 8.5 using 50% w/w sodium hydroxide solution.

The resultant liquid was the characteristic deep red of iron EDDHA and contained solid sodium chloride which was removed by centrifuge.

Approximately 62 parts of liquid concentrate were recovered containing 1.93% w/w iron with a relative density of 1.237, equivalent to an iron content of 2.39% w/v or 23.9 g dm$^{-3}$. This was increased to 4.2% w/v (42 g dm$^{-3}$) by removal of water by distillation.

The presence of iron EDDHA was confirmed by gel permeation chromatography.

EXAMPLE 6

Example 5 was repeated with 0.1 moles of p-cresol instead of 0.1 moles of phenol, the resulting iron EDDHMA compound being predominantly the ortho isomer, i.e. ethylenediamine-N,N'-di-(2-hydroxy-4-methylphenyl) acetic acid).

It has been noted that the viscosity of iron EDDHMA compositions can be unacceptably high if water is present in iron EDDHMA compositions of iron concentration as high as 40 or 50 g dm$^{-3}$. As much water as possible should preferably be distilled out of the reaction mixture for iron EDDHMA compositions of greater iron concentration than 35 g dm$^{-3}$. If possible, water should be avoided altogether in the synthesis.

EXAMPLES 7,8,9, and 10

The procedures of Examples 1,2,3 and 4 were repeated using ethylene glycol monoethyl ether instead of ethylene glycol and taking the standard precautions necessary due to the low flashpoint of the solvent. The compositions so produced were less viscous than the corresponding ethylene glycol compositions.

EXAMPLE 11

A composition according to Example 1 was tested under replicated glasshouse conditions (treatment 3) and compared with the powder chelate of 6% iron content by weight (treatment 2) and a control containing no iron (treatment 1). Conditions were as follows:

A wheat test crop was watered daily with an iron-free but otherwise balanced nutrient solution.

In treatment 1, no iron was added. In treatment 2, commercially-available iron EDDHA (6% by weight iron) was dissolved in water and watered into the soil at an application rate of 50 kgha$^{-1}$ FeEDDHA (6% Fe) and a water rate of 1000 dm$^3$ha$^{-1}$. In treatment 3, the composition of Example 1 was applied at a rate of 83.3 dm$^3$ha$^{-1}$, and a water rate of 1000 dm$^3$ha$^{-1}$, to give the same rate of application of iron as in treatment 2.

The experimental design was a randomized block, with four replicates of each treatment. The following results were obtained:

| Treatment | Leaf Iron Level (ppm) (% increase over the nil) | Grain Dry Yield (g/pot) (% increase over the nil) |
|---|---|---|
| 1. Nil | 53.5 | 24.39 |
| 2. 50 kg/ha Fe EDDHA (6% Fe) | 82.8 (54.8%) | 26.24 (7.6%) |
| 3. 83.3 l/ha Composition of example 1 (4% Fe) | 78.5 (46.7%) | 27.01 (10.7%) |

The results showed the composition from Example 1 to be as effective on an iron for iron basis, within experimental error, in correction of iron deficiency as powdered iron chelate (6% Fe) when applied to the soil by watering. Preparation and application was however much more convenient.

It will be evident that those skilled in the art may make numerous modifications of the specific embodiments described above without departing from the present inventive concepts. It is accordingly intended that the invention shall be construed as embracing each and every novel feature and novel combination of features present in or possessed by the compositions herein described and that the foregoing disclosure shall be read as illustrative and not as limited except to the extent set forth in the claims appended hereto.

We claim:

1. A liquid composition for dilution and subsequent use in treating iron deficiency in soils, the composition comprising at least one iron chelate compound selected from the group consisting of compounds containing the anion ⁻, compounds containing the anion ⁻ and mixtures of said compounds, said iron compound being present in an amount effective after dilution to treat iron deficiency in soils, and an agriculturally-acceptable organic solvent selected from the group consisting of polyhydric alcohol and ethers of polyhydric alcohols, the composition having a viscosity at 20° C. in the range of from 100 to 1000 centipoise and being sufficiently concentrated in iron that the relative amounts of said iron chelate and said organic solvent are such that the mass ratio of organic solvent to iron chelate in the composition does not exceed 3:1, and any water in the composition being present in an amount such that the ratio of water to organic solvent does not exceed 10:1.

2. A composition according to claim 1, in which the solvent comprises ethylene glycol or the monoethyl ether thereof.

3. A composition according to claim 1, in which the mass ratio of iron chelate to organic solvent does not exceed 3:1.

4. A composition according to claim 3, in which the mass ratio of iron chelate to organic solvent is about 1:1.

5. A composition according to claim 1, containing water in such an amount that the mass ratio of organic solvent to water does not exceed 99:1.

6. A composition according to claim 5, in which the mass ratio of organic solvent to water does not exceed 10:1.

7. A composition according to claim 6, in which the mass ratio of water to organic solvent is about 2:1.

8. A composition according to claim 5, which has been prepared from iron chelate material containing at least some of the water of the composition.

9. A composition according to claim 1, which has been prepared from iron chelate material synthesised in the organic solvent, at least some of which solvent is contained in the composition.

10. Treatment of iron deficiency in soils by use of a composition according to claim 1.

11. A method of preparing a composition according to claim 1, in which said iron chelate compound is synthesized in said organic solvent, from which iron chelate is not subsequently removed, such that said composition contains at least some of said organic solvent in which said synthesis takes place.

* * * * *

UNITED STATES PATENT AND TRADEMARK OFFICE
CERTIFICATE OF CORRECTION

PATENT NO. : 5,152,820
DATED : October 6, 1992
INVENTOR(S) : John M. Dawson and Vivian B. Warne It is certified that error appears in the above-indentified patent and that said Letters Patent is hereby corrected as shown below:

Column 6
Claim 1, line 41, after the first occurrence of "anion" insert --[Fe(III)EDDHA]--; and
Claim 1, line 41, after the second occurrence of "anion" insert --[Fe(III)EDDHMA]--.

Signed and Sealed this

Second Day of July, 1996

Attest:

BRUCE LEHMAN

Attesting Officer

Commissioner of Patents and Trademarks